US008769645B2

(12) United States Patent
Hirsh (10) Patent No.: US 8,769,645 B2
(45) Date of Patent: *Jul. 1, 2014

(54) BROKERING A CONNECTION TO ACCESS A SECURED SERVICE

(75) Inventor: Robert Bruce Hirsh, Dulles, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,822

(22) Filed: Sep. 15, 2012

(65) Prior Publication Data

US 2013/0174226 A1 Jul. 4, 2013

Related U.S. Application Data (63) Continuation of application No. 13/453,178, filed on Apr. 23, 2012, now Pat. No. 8,689,312, which is a continuation of application No. 12/720,959, filed on Mar. 10, 2010, now Pat. No. 8,176,541, which is a continuation of application No. 11/767,680, filed on Jun. 25, 2007, now Pat. No. 7,707,627, which is a continuation of application No. 09/894,919, filed on Jun. 29, 2001, now Pat. No. 7,237,257.

(60) Provisional application No. 60/282,857, filed on Apr. 11, 2001.

(51) Int. Cl.
*H04L 29/06* (2006.01)

(52) U.S. Cl.
USPC .................. 726/6; 726/8; 726/10; 726/12

(58) Field of Classification Search
USPC ..................... 726/3, 4, 6, 10–12
See application file for complete search history.

(56) References Cited

U.S. PATENT DOCUMENTS

| | | | | |
|---|---|---|---|---|
| 5,233,655 A | * | 8/1993 | Shapiro | 705/72 |
| 5,241,594 A | * | 8/1993 | Kung | 713/151 |
| 5,349,643 A | * | 9/1994 | Cox et al. | 713/155 |
| 5,455,953 A | * | 10/1995 | Russell | 710/266 |
| 5,481,720 A | * | 1/1996 | Loucks et al. | 726/21 |
| 5,506,961 A | * | 4/1996 | Carlson et al. | 726/5 |
| 5,537,474 A | * | 7/1996 | Brown et al. | 380/248 |
| 5,542,046 A | * | 7/1996 | Carlson et al. | 726/5 |

(Continued)

FOREIGN PATENT DOCUMENTS

WO WO 02/17101 2/2002

OTHER PUBLICATIONS

Explanation of the web of trust of PGP, Session Jun. 1998; www.rubin.ch/pgp/weboftrust.en.html.

(Continued)

*Primary Examiner* — David Garcia Cervetti
(74) *Attorney, Agent, or Firm* — Keller Jolley Preece (57) ABSTRACT

Leveraging a persistent connection to provide a client access to a secured service may include establishing a persistent connection with a client in response to a first request from the client, and brokering a connection between the client and a secured service based on a second request from the client by leveraging the persistent connection with the client. The brokering may occur before the client attempts to connect to the secured service directly and the connection may be established between the client and the secured service without provision by the client of authentication information duplicative or additional to authentication information provided by the client to establish the persistent connection.

20 Claims, 8 Drawing Sheets

(56) References Cited

U.S. PATENT DOCUMENTS

| | | | |
|---|---|---|---|
| 5,557,518 A | 9/1996 | Rosen | |
| 5,560,008 A * | 9/1996 | Johnson et al. | 726/5 |
| 5,590,199 A * | 12/1996 | Krajewski et al. | 713/159 |
| 5,592,553 A | 1/1997 | Guski et al. | |
| 5,604,490 A | 2/1997 | Blakley et al. | |
| 5,621,797 A | 4/1997 | Rosen | |
| 5,661,807 A * | 8/1997 | Guski et al. | 713/159 |
| 5,684,950 A * | 11/1997 | Dare et al. | 726/10 |
| 5,689,638 A * | 11/1997 | Sadovsky | 726/21 |
| 5,717,756 A | 2/1998 | Coleman | |
| 5,737,419 A * | 4/1998 | Ganesan | 713/169 |
| 5,774,551 A | 6/1998 | Wu et al. | |
| 5,774,670 A | 6/1998 | Montulli | |
| 5,793,966 A * | 8/1998 | Amstein et al. | 709/203 |
| 5,812,784 A * | 9/1998 | Watson et al. | 709/227 |
| 5,815,574 A * | 9/1998 | Fortinsky | 713/153 |
| 5,826,242 A | 10/1998 | Montulli | |
| 5,878,219 A | 3/1999 | Vance et al. | |
| 5,923,756 A * | 7/1999 | Shambroom | 713/156 |
| 5,944,794 A * | 8/1999 | Okamoto et al. | 709/225 |
| 5,944,824 A * | 8/1999 | He | 726/6 |
| 5,999,711 A * | 12/1999 | Misra et al. | 726/4 |
| 6,009,175 A * | 12/1999 | Schanze | 713/155 |
| 6,026,166 A * | 2/2000 | LeBourgeois | 713/156 |
| 6,032,260 A * | 2/2000 | Sasmazel et al. | 726/10 |
| 6,047,376 A * | 4/2000 | Hosoe | 726/5 |
| 6,055,637 A * | 4/2000 | Hudson et al. | 726/20 |
| 6,055,639 A * | 4/2000 | Schanze | 726/6 |
| 6,067,623 A * | 5/2000 | Blakley et al. | 726/5 |
| 6,073,242 A * | 6/2000 | Hardy et al. | 726/1 |
| 6,081,508 A | 6/2000 | West et al. | |
| 6,088,451 A * | 7/2000 | He et al. | 726/8 |
| 6,119,228 A * | 9/2000 | Angelo et al. | 713/180 |
| 6,134,591 A * | 10/2000 | Nickles | 709/229 |
| 6,134,592 A | 10/2000 | Montulli | |
| 6,138,239 A * | 10/2000 | Veil | 726/10 |
| 6,148,404 A * | 11/2000 | Yatsukawa | 726/2 |
| 6,157,953 A * | 12/2000 | Chang et al. | 709/225 |
| 6,161,185 A * | 12/2000 | Guthrie et al. | 726/5 |
| 6,163,771 A | 12/2000 | Walker et al. | |
| 6,175,920 B1 * | 1/2001 | Schanze | 713/150 |
| 6,178,511 B1 * | 1/2001 | Cohen et al. | 726/6 |
| 6,205,479 B1 * | 3/2001 | Dulai et al. | 709/225 |
| 6,219,790 B1 * | 4/2001 | Lloyd et al. | 726/14 |
| 6,223,289 B1 * | 4/2001 | Wall et al. | 726/16 |
| 6,226,752 B1 * | 5/2001 | Gupta et al. | 726/9 |
| 6,278,993 B1 | 8/2001 | Kumar et al. | |
| 6,279,111 B1 * | 8/2001 | Jensenworth et al. | 726/10 |
| 6,286,104 B1 * | 9/2001 | Buhle et al. | 726/4 |
| 6,292,896 B1 * | 9/2001 | Guski et al. | 713/169 |
| 6,314,520 B1 * | 11/2001 | Schell et al. | 726/13 |
| 6,324,648 B1 * | 11/2001 | Grantges, Jr. | 726/12 |
| 6,341,312 B1 * | 1/2002 | French et al. | 709/227 |
| 6,401,211 B1 * | 6/2002 | Brezak et al. | 726/5 |
| 6,405,312 B1 * | 6/2002 | Ly | 713/155 |
| 6,411,309 B1 * | 6/2002 | Ly | 715/733 |
| 6,430,602 B1 | 8/2002 | Kay et al. | |
| 6,477,648 B1 * | 11/2002 | Schell et al. | 726/22 |
| 6,480,958 B1 * | 11/2002 | Harrington | 713/184 |
| 6,484,174 B1 * | 11/2002 | Wall et al. | 1/1 |
| 6,490,358 B1 * | 12/2002 | Geer et al. | 380/286 |
| 6,490,579 B1 | 12/2002 | Gao et al. | |
| 6,490,679 B1 * | 12/2002 | Tumblin et al. | 713/155 |
| 6,538,996 B1 * | 3/2003 | West et al. | 370/238 |
| 6,578,151 B1 * | 6/2003 | Nilsen | 726/11 |
| 6,584,505 B1 * | 6/2003 | Howard et al. | 709/225 |
| 6,587,880 B1 * | 7/2003 | Saigo et al. | 709/225 |
| 6,609,198 B1 * | 8/2003 | Wood et al. | 713/155 |
| 6,615,348 B1 * | 9/2003 | Gibbs | 713/162 |
| 6,636,975 B1 * | 10/2003 | Khidekel et al. | 726/10 |
| 6,643,774 B1 * | 11/2003 | McGarvey | 713/155 |
| 6,658,573 B1 * | 12/2003 | Bischof et al. | 726/16 |
| 6,668,253 B1 | 12/2003 | Thompson et al. | |
| 6,668,322 B1 * | 12/2003 | Wood et al. | 713/182 |
| 6,678,731 B1 * | 1/2004 | Howard et al. | 709/225 |
| 6,678,733 B1 * | 1/2004 | Brown et al. | 709/229 |
| 6,691,232 B1 * | 2/2004 | Wood et al. | 726/6 |
| 6,728,884 B1 | 4/2004 | Lim | |
| 6,731,731 B1 | 5/2004 | Ueshima | |
| 6,732,269 B1 * | 5/2004 | Baskey et al. | 713/153 |
| 6,763,468 B2 * | 7/2004 | Gupta et al. | 726/2 |
| 6,775,692 B1 * | 8/2004 | Albert et al. | 709/207 |
| 6,792,534 B2 * | 9/2004 | Medvinsky | 713/171 |
| 6,823,456 B1 * | 11/2004 | Dan et al. | 713/178 |
| 6,968,571 B2 * | 11/2005 | Devine et al. | 726/11 |
| 6,983,377 B1 | 1/2006 | Beesley et al. | |
| 6,986,040 B1 * | 1/2006 | Kramer et al. | 713/155 |
| 6,996,841 B2 * | 2/2006 | Kadyk et al. | 726/12 |
| 7,024,692 B1 * | 4/2006 | Schanze et al. | 726/10 |
| 7,039,714 B1 * | 5/2006 | Blakley, III et al. | 709/229 |
| 7,062,781 B2 * | 6/2006 | Shambroom | 726/10 |
| 7,065,574 B1 * | 6/2006 | Saulpaugh et al. | 709/225 |
| 7,076,797 B2 * | 7/2006 | Loveland | 726/4 |
| 7,113,994 B1 * | 9/2006 | Swift et al. | 709/229 |
| 7,117,359 B2 | 10/2006 | Wood et al. | |
| 7,117,529 B1 * | 10/2006 | O'Donnell et al. | 726/6 |
| 7,124,203 B2 * | 10/2006 | Joshi et al. | 709/248 |
| 7,137,006 B1 * | 11/2006 | Grandcolas et al. | 713/180 |
| 7,174,565 B2 * | 2/2007 | Kadyk et al. | 726/12 |
| 7,225,341 B2 * | 5/2007 | Yoshino et al. | 713/193 |
| 7,228,291 B2 | 6/2007 | Seamons et al. | |
| 7,234,057 B2 * | 6/2007 | Park | 713/155 |
| 7,237,257 B1 | 6/2007 | Hirsh | |
| 7,249,110 B1 * | 7/2007 | Kimura et al. | 705/67 |
| 7,266,821 B2 * | 9/2007 | Polizzi et al. | 718/100 |
| 7,305,478 B2 * | 12/2007 | Willins et al. | 709/229 |
| 7,395,549 B1 * | 7/2008 | Perlman et al. | 726/10 |
| 7,424,538 B2 * | 9/2008 | Igarashi et al. | 709/227 |
| 7,437,552 B2 * | 10/2008 | Shin | 713/160 |
| 7,458,082 B1 * | 11/2008 | Slaughter et al. | 719/328 |
| 7,464,143 B2 * | 12/2008 | Pieper et al. | 709/219 |
| 7,472,273 B2 * | 12/2008 | Haverinen | 713/168 |
| 7,539,310 B2 * | 5/2009 | Mitchell et al. | 380/277 |
| 7,558,866 B2 * | 7/2009 | Choe et al. | 709/229 |
| 7,707,627 B2 | 4/2010 | Hirsh | |
| 7,716,492 B1 * | 5/2010 | Saulpaugh et al. | 713/185 |
| 7,716,722 B2 * | 5/2010 | Swift et al. | 726/3 |
| 7,954,144 B1 * | 5/2011 | Ebrahimi et al. | 726/12 |
| 7,991,694 B2 | 8/2011 | Takayama | |
| 8,176,541 B1 | 5/2012 | Hirsh | |
| 8,261,271 B2 * | 9/2012 | Polizzi et al. | 718/100 |
| 2001/0005890 A1 * | 6/2001 | Nitaki | 713/202 |
| 2001/0020274 A1 * | 9/2001 | Shambroom | 713/201 |
| 2001/0037466 A1 * | 11/2001 | Fukutake et al. | 713/201 |
| 2001/0047484 A1 * | 11/2001 | Medvinsky et al. | 713/201 |
| 2002/0023122 A1 * | 2/2002 | Polizzi et al. | 709/202 |
| 2002/0023158 A1 * | 2/2002 | Polizzi et al. | 709/227 |
| 2002/0049912 A1 * | 4/2002 | Honjo et al. | 713/201 |
| 2002/0052954 A1 * | 5/2002 | Polizzi et al. | 709/225 |
| 2002/0130764 A1 * | 9/2002 | Hayakawa | 340/5.82 |
| 2002/0144119 A1 * | 10/2002 | Benantar | 713/171 |
| 2002/0147813 A1 * | 10/2002 | Teng et al. | 709/225 |
| 2002/0156901 A1 * | 10/2002 | Erickson et al. | 709/227 |
| 2002/0156906 A1 * | 10/2002 | Kadyk et al. | 709/229 |
| 2002/0157019 A1 * | 10/2002 | Kadyk et al. | 713/201 |
| 2003/0018913 A1 * | 1/2003 | Brezak et al. | 713/201 |
| 2003/0110374 A1 * | 6/2003 | Yamamoto et al. | 713/155 |
| 2003/0115341 A1 * | 6/2003 | Sinha et al. | 709/229 |
| 2003/0149854 A1 * | 8/2003 | Yoshino et al. | 711/173 |
| 2004/0059797 A1 * | 3/2004 | Velan et al. | 709/219 |
| 2004/0078571 A1 * | 4/2004 | Haverinen | 713/168 |
| 2004/0088260 A1 * | 5/2004 | Foster et al. | 705/64 |
| 2005/0065950 A1 * | 3/2005 | Chaganti et al. | 707/100 |
| 2005/0114531 A1 * | 5/2005 | Kadyk et al. | 709/229 |
| 2005/0216773 A1 * | 9/2005 | Mitchell et al. | 713/201 |
| 2005/0235345 A1 * | 10/2005 | Mitchell et al. | 726/10 |
| 2006/0225132 A1 * | 10/2006 | Swift et al. | 726/11 |
| 2009/0150989 A1 * | 6/2009 | Hoey et al. | 726/10 |
| 2012/0260316 A1 | 10/2012 | Hirsh | |

OTHER PUBLICATIONS

Unix Network Programming, W. Richard Stevens, Security; Section 9.3 Kerberos, 1990; pp. 430-436.

(56) References Cited

OTHER PUBLICATIONS

Menezes et al., Handbook of Applied Cryptography, 1997, CRC Press, Chapter 10, pp. 385-424.
U.S. Appl. No. 09/894,919, Mail Date Dec. 9, 2004, Office Action.
U.S. Appl. No. 09/894,919, Mail Date Jun. 3, 2005, Office Action.
U.S. Appl. No. 09/894,919, Mail Date Jul. 26, 2006, Office Action.
U.S. Appl. No. 09/894,919, Mail Date Feb. 20, 2007, Notice of Allowance.
U.S. Appl. No. 11/767,680, Mail Date Jul. 15, 2009, Office Action.
U.S. Appl. No. 11/767,680, Mail Date Dec. 24, 2009, Notice of Allowance.
U.S. Appl. No. 12/720,959, Mail Date Aug. 5, 2011, Office Action.
U.S. Appl. No. 12/720,959, Mail Date Jan. 10, 2012, Notice of Allowance.
U.S. Appl. No. 13/453,178, Mail Date Jun. 4, 2013, Office Action.
U.S. Appl. No. 13/453,178, Mail Date Oct. 30, 2013, Notice of Allowance.
U.S. Appl. No. 13/453,178, Mail Date Dec. 13, 2013, Notice of Allowance.

* cited by examiner

BROKERING A CONNECTION TO ACCESS A SECURED SERVICE

The present application is a continuation of U.S. application Ser. No. 13/453,178, filed Apr. 23, 2012, which is a continuation of U.S. application Ser. No. 12/720,959, filed Mar. 10, 2010, which is now issued as U.S. Pat. No. 8,176,541, which is a continuation of U.S. application Ser. No. 11/767,680, filed Jun. 25, 2007, which is now issued as U.S. Pat. No. 7,707,627, which is a continuation of U.S. application Ser. No. 09/894,919, filed Jun. 29, 2001, which is now issued as U.S. Pat. No. 7,237,257, which claims the benefit of and priority to U.S. provisional application No. 60/282,857, filed Apr. 11, 2001. Each of the aforementioned patent(s) and application(s) are hereby incorporated by reference in their entirety.

TECHNICAL FIELD

This invention relates to providing access to a secured service.

BACKGROUND

A secured service may require the provision of authentication information before allowing a connection to be established from a client seeking access. Various secured services may be accessed simultaneously by one client, each generally requiring the accessing client to provide authentication information that is duplicative or additional to the authentication information provided to the other secured services before allowing access to be established. For instance, a client may establish a connection with a first secured service by providing the first secured service with first authentication information. Thereafter, the same client seeking access to other secured services may be required again to provide those other secured services with second authentication information that is duplicative and/or additional to the first authentication information provided to the first secured service.

SUMMARY

In one general aspect, leveraging a persistent connection to provide a client access to a secured service includes establishing a persistent connection with the client in response to a first request from the client, and brokering a connection between the client and a secured service based on a second request from the client by leveraging the persistent connection with the client. The brokering may occur before the client attempts to connect to the secured service directly and the connection may be established between the client and the secured service without provision by the client of authentication information duplicative or additional to authentication information provided by the client to establish the persistent connection.

Implementations may include one or more of the following features. For example, establishing the persistent connection may include receiving keystone authentication information from the client, authenticating the client based on the keystone authentication information to provide a keystone authentication, and establishing the persistent connection with the client based on the keystone authentication.

Leveraging the persistent connection may include receiving the second request from the client for connection to the secured service after the persistent connection to the client is established. Leveraging the persistent connection also may include providing a leveraged authentication that may be used to establish the connection with the secured service and that is based on the keystone authentication associated with the persistent connection. The keystone authentication also may be used to provide the leveraged authentication without provision by the client of authentication information duplicative or additional to the keystone authentication information used to establish the persistent connection.

The persistent connection may be established between the client and a persistent connection service while the connection between the client and the secured service may be brokered by a broker service. The broker service may receive from the persistent connection service at a connection request address a communication based on the second request from the client, and the persistent connection service may authenticate the client to the broker service by leveraging the persistent connection.

Brokering the connection to the secured service may include communicating as an intermediary with the client and the secured service based on the second request from the client so that the client may obtain authorization information that may be used to establish the connection to the secured service. For example, in one implementation brokering includes determining the authorization information based on the second request from the client, and communicating to the secured service an indication that the client desires to connect to the secured service, in which the indication includes the authorization information. A response is received from the secured service indicating that the client may be allowed to establish the connection to the secured service by presenting the authorization information to the secured service, and the authorization information is communicated to enable the client to present the authorization information to the secured service to establish the connection with the secured service.

In another implementation, brokering includes communicating to the secured service an indication that the client desires to connect to the secured service, receiving a response from the secured service indicating that the secured service may accept a connection from the client, in which the response includes the authorization information, and communicating the authorization information to enable the client to present the authorization information to the secured service to establish the connection with the secured service. The authorization information may be determined by the secured service.

The authorization information may be ineffective to establish a connection with the secured service if the connection constraints are not satisfied by the constraint information. The connection constraints may include, for example, a constraint to limit the number of uses for the authorization information to a predetermined number (e.g., a one-time-use password), and/or information indicating a number of uses to which the authorization information has been put. The connection constraints also may include a constraint that the authorization information be used within a predetermined time window, and/or a constraint that the authorization information be presented to the secured service by a client for whom the connection was brokered.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings may indicate like elements.

DETAILED DESCRIPTION

For illustrative purposes, a process is described for leveraging a persistent connection to provide access to a secured service, and systems and software for implementing the process also are described. For clarity of exposition, the description generally proceeds from an account of general elements and their high level relationship to a detailed account of illustrative roles, configurations, and components of the elements.

Figure 1:
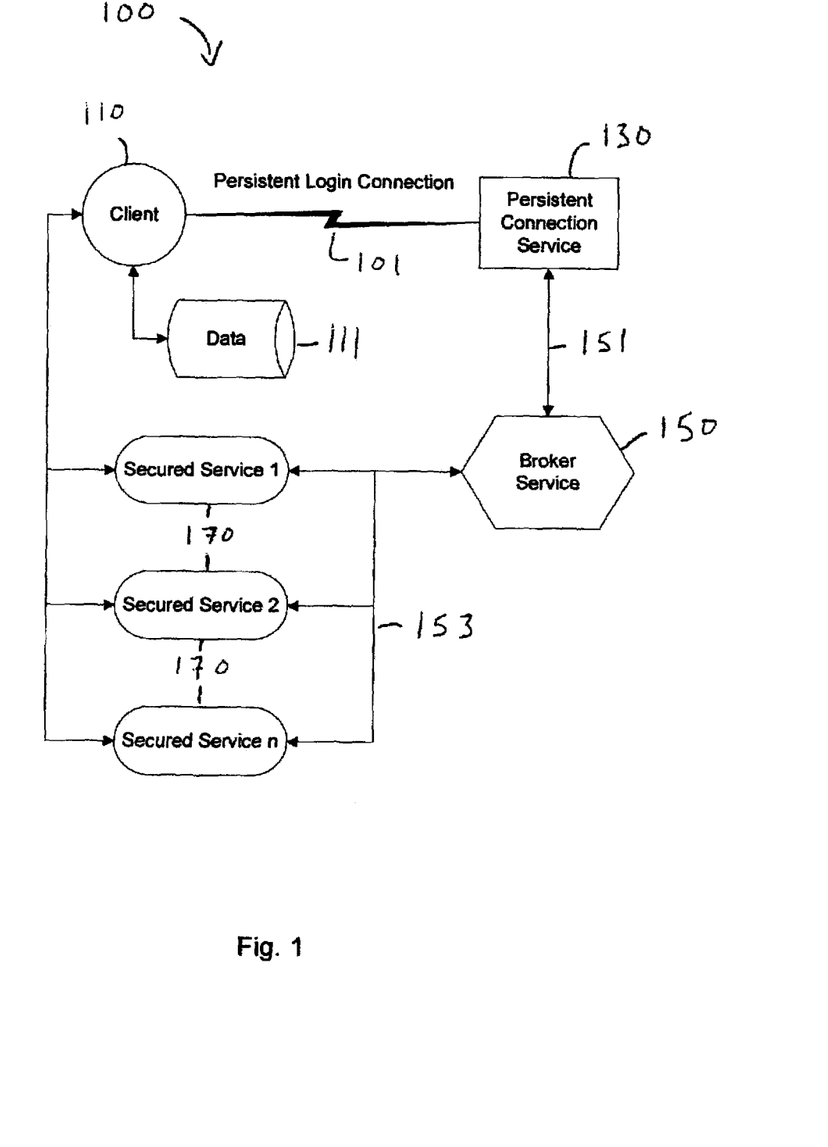
FIG. 1 is a is a schematic diagram of a system configured to provide a client having an established persistent connection with access to a secured service.

Referring to FIG. 1, a generalized system 100 may be used to permit a client 110 to leverage a persistent connection 101 to a persistent connection service 130 by which access may be gained to a secured service 170, in which gaining access to the secured service 170 may or may not include establishing another persistent connection with the secured service 170. Exemplary components of the system 100 are described in greater detail below.

The system 100 of FIG. 1 generally includes the client 110, the persistent connection service 130, a broker service 150, and one or more secured services 170.

The client 110 generally may include any device, system, and/or piece of code that relies on another service to perform an operation. For example, the client 110 may include a Web browser, an email client, a synchronization client (e.g., a calendar synchronization client, a task list synchronization client), an instant messaging (IM) client, a software productivity application (e.g., a word processor, a spreadsheet), and/or an operating system or operating system kernel. The client 110 also may be configured to access data that may be stored, for example, in a magnetic and/or an optical storage medium and/or any other acceptable storage medium accessible to the client 110 (e.g., storage medium 111).

The persistent connection service 130 may include, for example, an IM service, an email service (e.g., an IMAP service), a login service, an authentication service, an authorization service, and/or any other service or combination of services configured to provide a persistent connection, while the broker service 150 may include, for example, any device, system, and/or piece of code configured to broker a connection as hereinafter described between a client with a persistent connection and a secured service.

A secured service 170 generally may include, for example, any device, system, and/or piece of code configured to perform an operation requested by a client 110 (e.g., a Web browser, another service). For example, the secured service 170 may include an email service, a synchronization service (e.g., a calendar synchronization service, a task list synchronization service), a print service, a file access service, an IM service, an operating system, an operating system kernel, an authentication service, an authorization service, and/or any combination of these services. The secured service 170 also may include a persistent connection service.

One or more other services may be included in the components of system 100 and/or these components (hereinafter the system services) may be included as part of one or more other services. For example, the system services may include or be included in a general-purpose or a special-purpose computer (e.g., a personal computer, a personal digital assistant (PDAs), or a device specifically programmed to perform certain tasks), at least one Local Area Network (LAN), and/or at least one Wide Area Network (WAN). Either way, the response to and execution of instructions received by any or all of the system services may be controlled by, for example, a program, a piece of code, an instruction, a device, a computer system, or a combination thereof, for independently or collectively instructing the services to interact and operate as described herein.

A persistent connection 101 may be established between the client 110 and the persistent connection service 130 and the persistent connection service 130 may be configured to communicate with the broker service 150, or the broker service 150 may be included as a component of the persistent connection service 130. The broker service 150 and the client 110 may be configured to communicate with the one or more secured services 170.

The persistent connection between the client 110 and the persistent connection service 130 as well as other communications between the system services generally occur over a communications network. The communication network typically allows direct or indirect communication between the system services (e.g., between the client 110, the persistent connection service 130, the broker service 150, and/or the secured services 170), irrespective of physical or logical separation. The communication network may include a secured communication network (e.g., a communication network protected by a firewall) that may include communication paths 151 and 153 over which the broker service 150 may communicate with the persistent connection service 130 and/or the secured services 170, respectively. The secured communication network, for example, may isolate the broker service 150 from the client 110 so that the broker service 150 is not visible to the client 110.

The communication network may include various mechanisms for delivering voice and/or non-voice data, such as, for example, the transport connection protocol (TCP), the Internet protocol (IP), the World Wide Web, one or more local area networks (LANs) and/or one or more wide area networks (WANs). The communication network also may include analog or digital wired and wireless telephone networks, e.g., public switched telephone networks (PSTN), integrated services digital networks (ISDN), various types of digital subscriber lines (xDSL), advance mobile telephone service (AMPS), global system for mobile communications (GSM), code division multiple access (CDMA), radio, cable, satellite, and/or other delivery mechanisms for carrying voice or non-voice data.

To communicate voice and/or non-voice data, the system services may include one or more communications systems in addition to the components described above, such as, for example, an analog, a digital, or a cellular telephone, whether wired or wireless, a program, a piece of code, an instruction, a device, a computer, a computer system, or a combination thereof, for independently or collectively sending or receiving communications. Implementations of communications systems may exist permanently or temporarily in any type of machine, component, physical or virtual equipment, storage medium, or propagated signal capable of sending or receiving voice communications.

Figure 2:
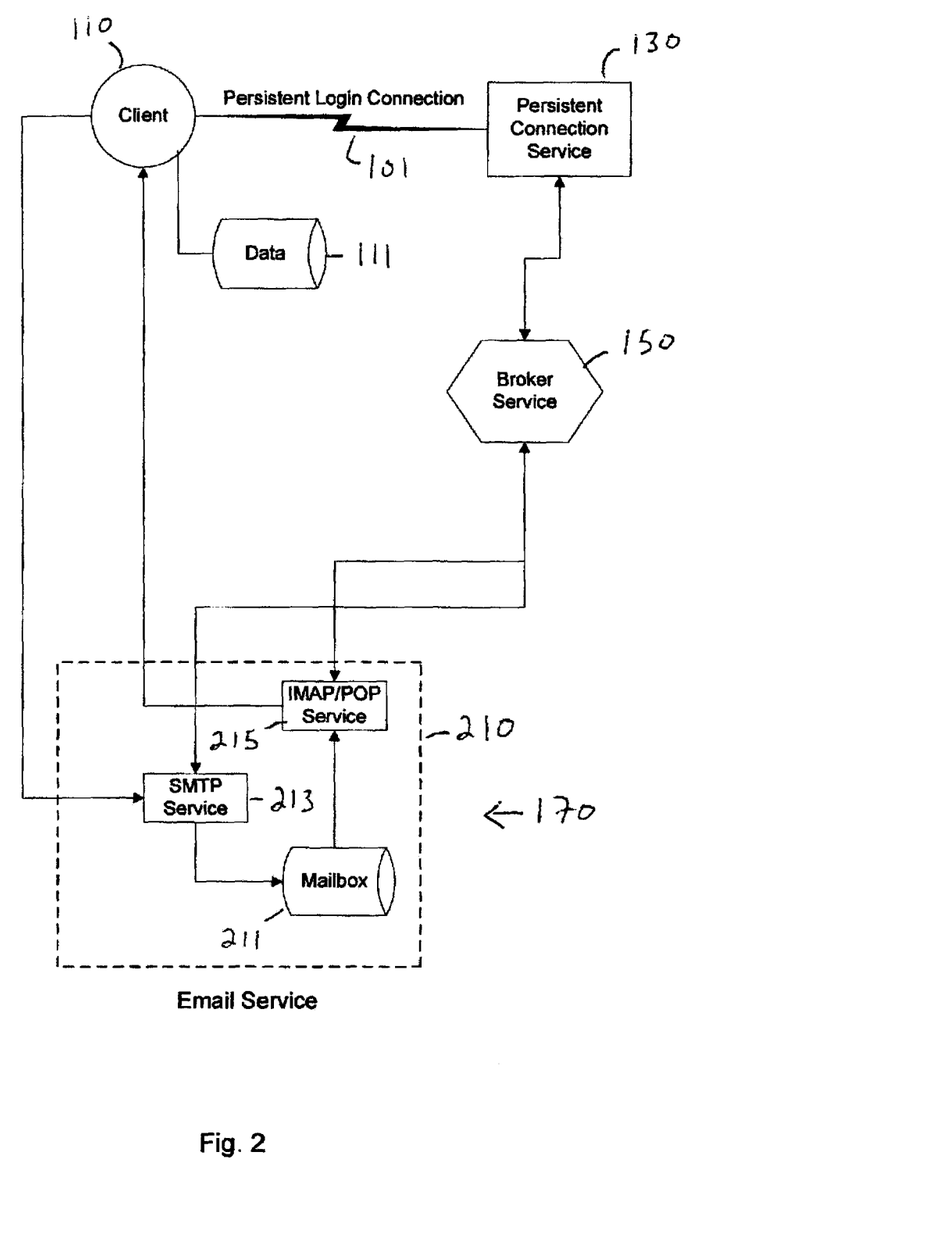
FIG. 2 is a schematic diagram illustrating a system, as in FIG. 1, in which the secured service is an IMAP mail service.
Figure 3:
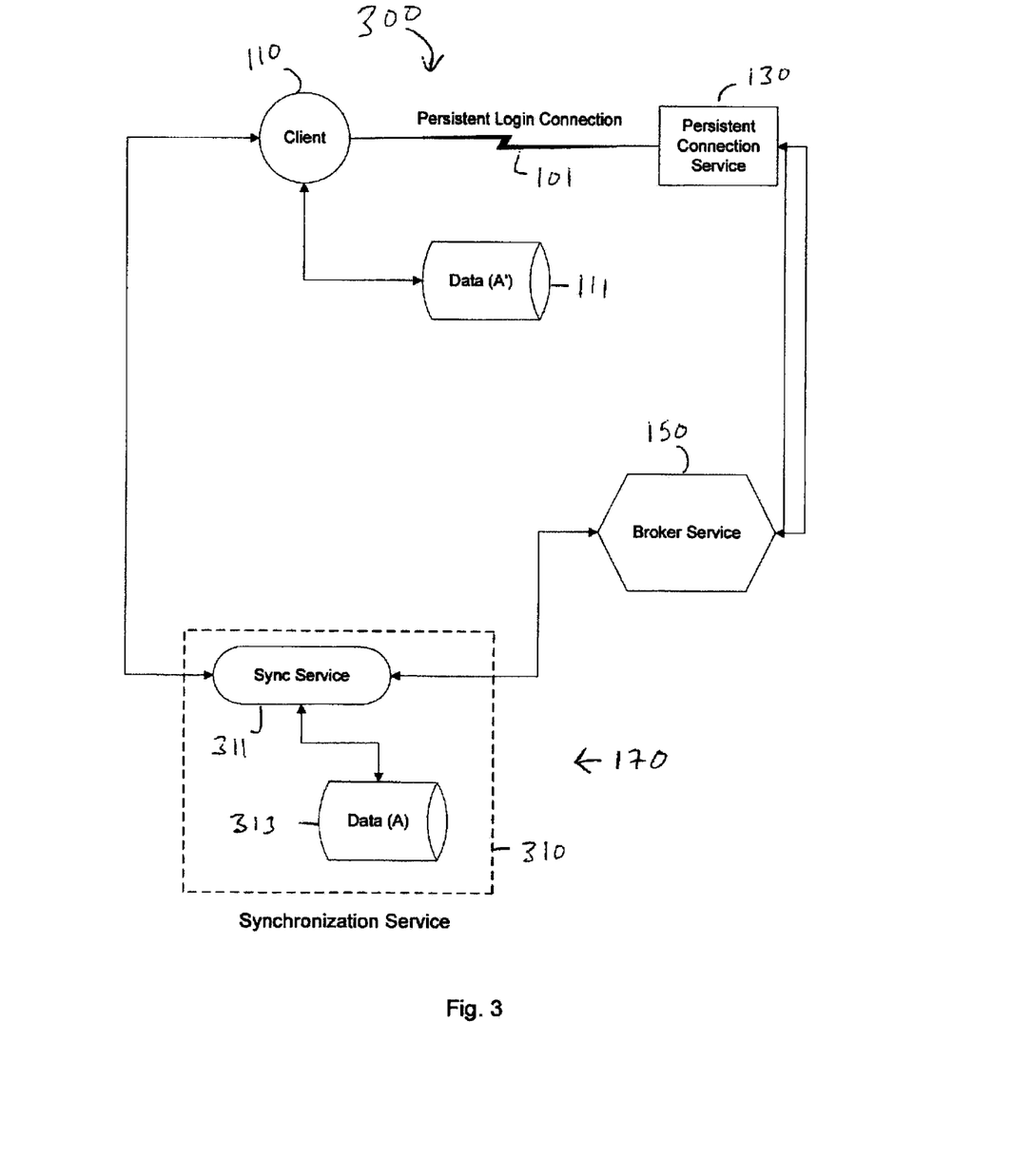
FIG. 3 is a schematic diagram illustrating a system, as in FIG. 1, in which the secured service is a synchronization service.

FIGS. 2 and 3 describe systems generally similar to system 100 of FIG. 1 but that illustrate the inclusion of specific secured services (i.e., an email service and a synchronization service, respectively) that may be accessed by the client 110.

Referring to FIG. 2, a system 200 is illustrated in which the client 110 and the broker service 150 may communicate with a secured service 170 that includes an email service 210. The email service 210 may be used to transmit and to receive electronic messages and may include a mailbox 211 in which received messages may be stored. The email service 210 also may include a mail transfer protocol service 213 that may be used to send an electronic message, using a protocol such as, for example, the simple mail transfer protocol (SMTP). The email service 210 also may include a retrieval service used to retrieve email messages from the mailbox 211 under a protocol, such as, for example, the Internet message access protocol (IMAP), and/or the post office protocol (POP) 215.

Referring to FIG. 3, a system 300 is illustrated in which the client 110 is configured to access data A' (e.g., a modified calendar, a modified task list) that may, for example, include a modified version of original data A (e.g., an original calendar, an original task list). Data A' may be stored, for example, in a magnetic and/or an optical storage medium and/or any other acceptable storage medium accessible to the client 110 (e.g., storage medium 111), whether internal or external to the client 110. The client 110 and the broker service 150 may communicate with a secured service 170 that includes a synchronization service 310 (e.g., the calendar synchronization service or the task list synchronization service mentioned above). The synchronization service 310 may include a sync service 311 that may be configured, for example, to access original data A and to synchronize that original data A with modified data A'. Data A may be stored, for example, in a disk array (e.g., disk array 313) and/or any other acceptable storage medium accessible to the sync service 311, whether internal or external to the sync service 311.

Figure 4:
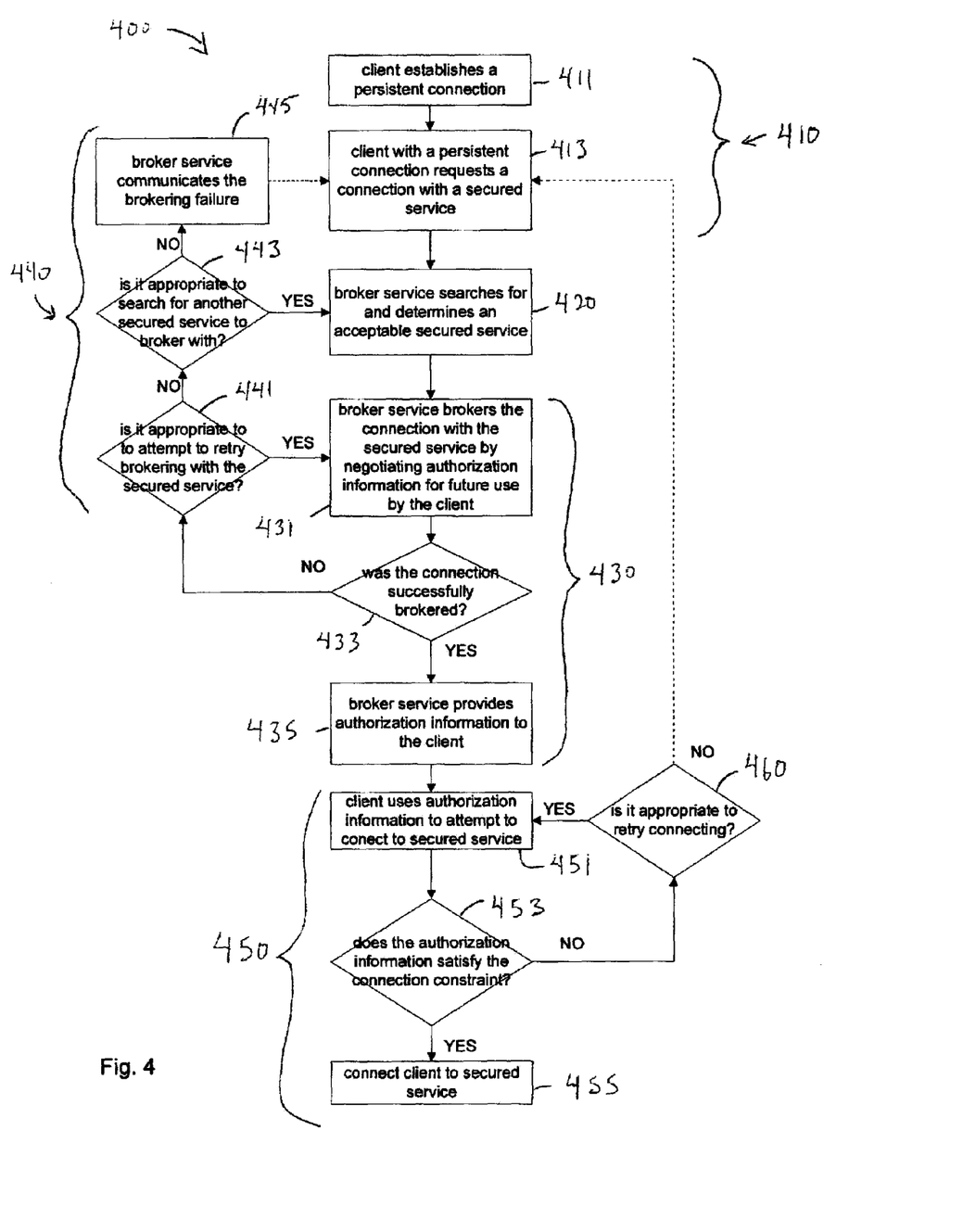
FIG. 4 is a schematic flow diagram illustrating a systematic process implementable by the system of FIG. 1 for providing a client having an established persistent connection with access to a secured service.

FIG. 4 illustrates a systematic process 400 that may be implement by the system of FIG. 1 to provide a client 110 having an established persistent connection 101 with access to a secured service 170. Process 400 provides that the client 110 may establish a persistent connection 101 with the persistent connection service 130 and the persistent connection service 130 may authenticate the client 110 (hereinafter referred to as keystone authentication) based on authentication information provided by the client 110 (step 411). The persistent connection service 130 may or may not include the broker service 150.

Later, after the persistent connection 101 is established, the client 110 may request access to a desired secured service 170 (step 413). For example, the client 110 may request the connection to the secured service 170 by sending the request for that access to the persistent connection service 130.

When embodied separately from the broker service, the persistent connection service 130 typically forwards the connection request to the broker service 150 at a connection request address associated with the broker service 150. The persistent connection service 130 may leverage the keystone authentication to authenticate the client 110 to the broker service 150, without requiring the client 110 to provide duplicative or additional authentication information.

Figure 6:
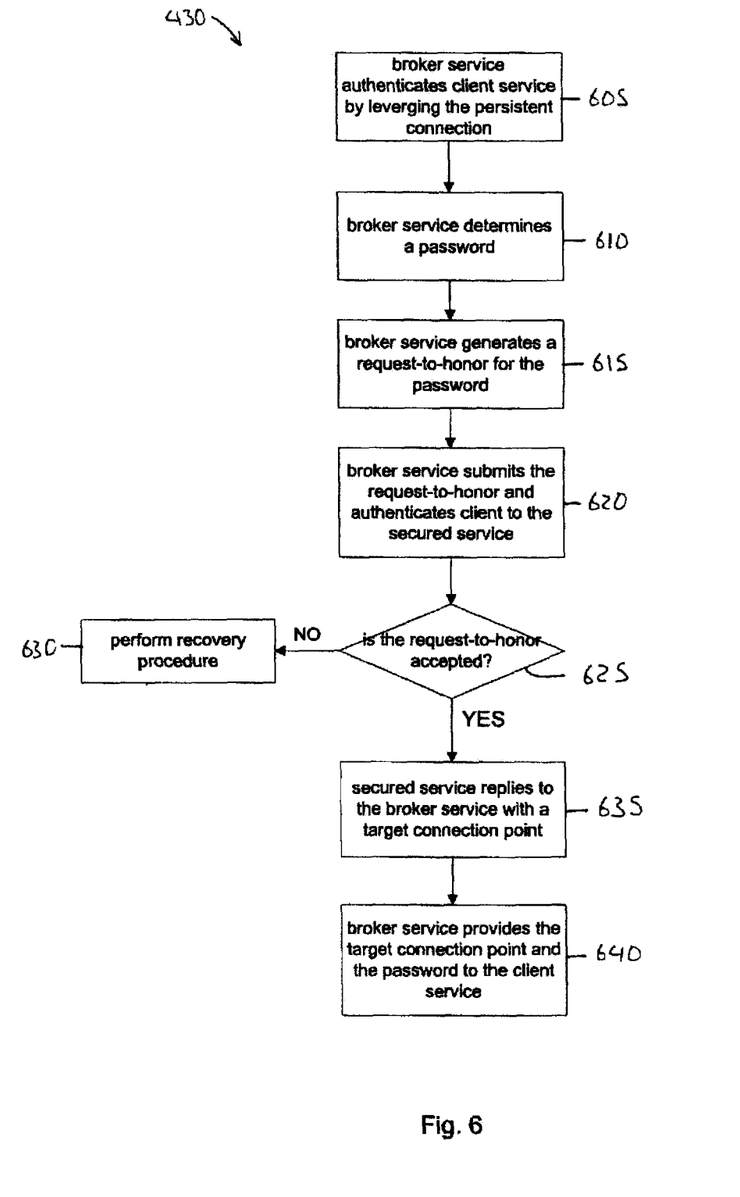
FIGS. 6 and 7 are schematic flow diagrams illustrating processes that may be used to broker a connection with a secured service, as provided generally in FIG. 4.
Figure 7:
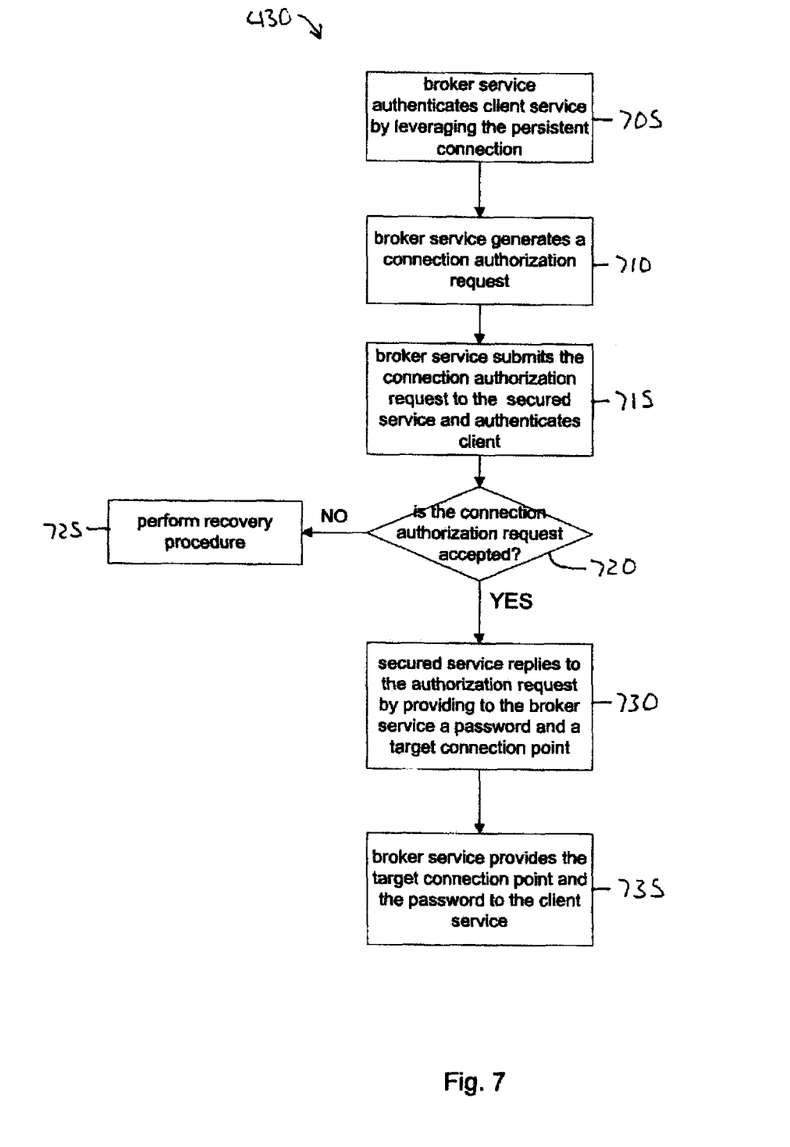

Following receipt of the connection request, the broker service 150 may search for and determine an acceptable secured service 170 (e.g., an email service if the client 110 wishes to send or receive an electronic message) (step 420) and may broker a connection with the secured service 170 (examples of brokering are described in detail with respect to FIGS. 6 and 7) (step 431). Authorization information (described in greater detail below) may be determined during the brokering of the connection (step 431) and the keystone authentication may be leveraged to authenticate the client 110 to the secured service 170.

If the broker service 150 is unable to broker a connection with the determined secured service 170 (step 433), then the broker service 150 may perform a recovery procedure (step 440). The recovery procedure (step 440) may include determining whether it is appropriate to retry brokering with the secured service 170 (e.g., a retry may occur where brokering has failed less than a predetermined threshold of times) (step 441), and, if determined appropriate, the broker service 150 may attempt again to broker a connection with the secured service 170 (step 431). Otherwise, the broker service 150 may determine whether to search for another secured service 170 with which to broker a connection (e.g., another secured service 170 may be sought where less than a predetermined threshold of time has elapsed since the client 110 requested access to a secured service 170) (step 443). If determined appropriate, the broker service 150 may search for a different secured service 170 (step 420), or, if not, the broker service 150 may communicate to the client 110 a failure successfully to broker a connection with a secured service 170 (step 445) after which the client may or may not request the broker service to broker another connection (step 413).

If, however, the broker service 150 successfully brokered a connection to the secured service 170 (step 433), then the broker service 150 may provide the authorization information determined during the brokering process to the client 110 (step 435). The authorization information may be used by the client 110 to contact the secured service 170. The secured service 170 may receive the authorization information and may determine if the authorization information satisfies one or more connection constraints (examples of constraints are described below and with respect to FIG. 8) (step 453).

If the connection constraints are not satisfied (step 453), then the secured service 170 may not accept the authorization information and may refuse the connection. Upon refusal of the connection by the secured service 170, the client 110 may determine whether it is appropriate to retry connecting using the authorization information (step 460). For instance, it may be appropriate to retry where the authorization information has been refused less than a predetermined number of times and/or where the connection constraints associated with the authorization information are not known to be violated. If determined appropriate, the client 110 may again provide the authorization information to the secured service 170 (step 451). Otherwise, the client 110 may or may not receive a report of the failed connection (step 470) and/or request that the broker service 150 broker a connection with another secured service 170 (step 413).

By contrast, if the secured service 170 determines that the authorization information satisfies the connection constraints (step 453), then the secured service 170 may accept the authorization information and may permit the client 110 to connect to the secured service 170 (step 455).

The connection constraints, mentioned above with respect to step 453, may include, for example, a constraint that the authorization information has been used (e.g., received by the secured service 170 and/or accepted by the secured service 170) no more than a predetermined number of times (e.g., once), a constraint that the authorization information should be used within a predetermined time window (e.g., thirty-seconds from the time of determination of the authorization information), and/or a constraint that the authorization information be received from the same client 110 for whom the connection was brokered.

The authorization information may include constraint information that may be used to determine if the authorization information satisfies the connection constraints. Moreover, the authorization information may include a password and the password may include some or all of the constraint information. The constraint information may include an indication of a number of uses for which the authorization information may be considered valid (e.g., 1, 2, 3), an indication of a time when the authorization information was determined (e.g., a time stamp), and/or an indication of a window of time relative to the time stamp during which the authorization information may be considered valid. The constraint information also may include information indicative of an identity of the client 110 for whom the authorization information was determined.

For example, the password may include constraint information, such as, a screen name, a login name, a biometric signature, and/or a digital signature of the client 110, or any combination of these. The password also may contain constraint information indicating that the password is valid for only one use, is valid only if used within thirty-seconds of determination of the password, and/or is valid only if received from the client 110 for whom the password was determined (e.g., a one-time use, time-limited, designated-user password, hereinafter a constrained password).

Figure 5:
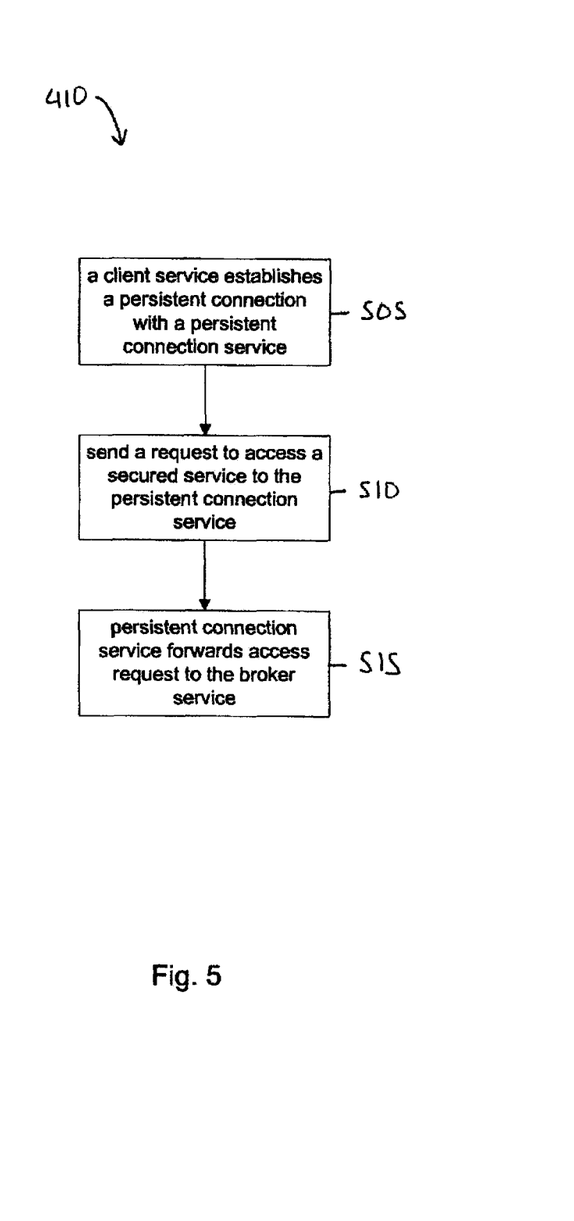
FIG. 5 is a schematic flow diagram illustrating a connection process that may be used to establish a persistent connection, as provided generally in FIG. 4.

FIG. 5 illustrates a process 410 by which the client 110 may establish a persistent connection 101 and may request a connection to a secured service 170, and that may be used in one implementation of the process of FIG. 4. The process 410 includes establishing a persistent connection 101 between the client 110 and a persistent connection service 130 (step 505). Before allowing the client 110 to establish the persistent connection 101, the persistent connection service 130 may require that the client 110 provide authentication information by which the persistent connection service 130 may authenticate the client 110 (the keystone authentication). Thereafter, the client 110 may communicate a request to the persistent connection service 130 to connect to a secured service 170, which request may include information indicating a secured service 170 to which connection is desired (step 510). The persistent connection service 130 may forward the connection request to the broker service 150 (step 515) and also may leverage the keystone authentication to authenticate the client 110 to the broker service 150, e.g., without provision of duplicative or additional authentication information by the client 110.

FIG. 6 illustrates an exemplary implementation of the process 430 of FIG. 4 that may be used to broker a connection to the secured service 170. As illustrated by FIG. 6, the broker service 150 may authenticate the client 110 based on the persistent connection 101 of the client 110 to the persistent connection service 130 (e.g., by leveraging the keystone authentication) (step 605). The broker service 150 then may generate/determine a constrained password (step 610) and also may generate a request-to-honor for the constrained password that may include the constrained password (step 615). The broker service 150 may submit the request-to-honor to the secured service 170 and may leverage the persistent connection 101 of the client 110 to authenticate the client 110 to the secured service 170 (step 620). The secured service 170 may reject the request-to-honor (step 625), which may cause the broker service 150 to perform a recovery procedure (step 630) that generally may be similar to recovery procedure 440 of FIG. 4. Otherwise, if the request to honor is accepted by the secured service 170 (step 625), then the secured service 170 may store the constrained password and reply to the broker service 150 with a target connection point (step 635), such as, for example, an IP address, a World Wide Web address, a port, a socket, and/or any combination of these. The broker service 150 may communicate the target connection point and the constrained password to the client 110 (e.g., by communicating the target connection point and the constrained password to the persistent connection service 130 to forward to the client 110) (step 640).

FIG. 7 illustrates another process 430 that may be used to broker a connection to the secured service 170 and to implement the process of FIG. 4. The broker service 150 may authenticate the client 110 based on the persistent connection 101 of the client 110 to the persistent connection service 130 (e.g., by leveraging the keystone authentication) (step 705). The broker service 150 then may generate a connection authorization request (step 710) and may submit the connection authorization request to the secured service 170 while leveraging the persistent connection 101 of the client 110 to authenticate the client 110 to the secured service 170 (step 715). The secured service 170 may reject the connection authorization request (step 720), which may cause the broker service 150 to perform a recovery procedure (step 725) that generally may be similar to recovery procedure 440 of FIG. 4. Otherwise, if the connection authorization request is accepted by the secured service 170 (step 720), then the secured service 170 may reply to the authorization request by providing to the broker service 150 a constrained password and/or a target connection point that the secured service 170 also may retain and store (step 730). The broker service 150 may communicate the target connection point and the constrained password to the client 110 (e.g., by communicating the target connection point and the constrained password to the persistent connection service 130 to forward to the client 110) (step 735).

Figure 8:
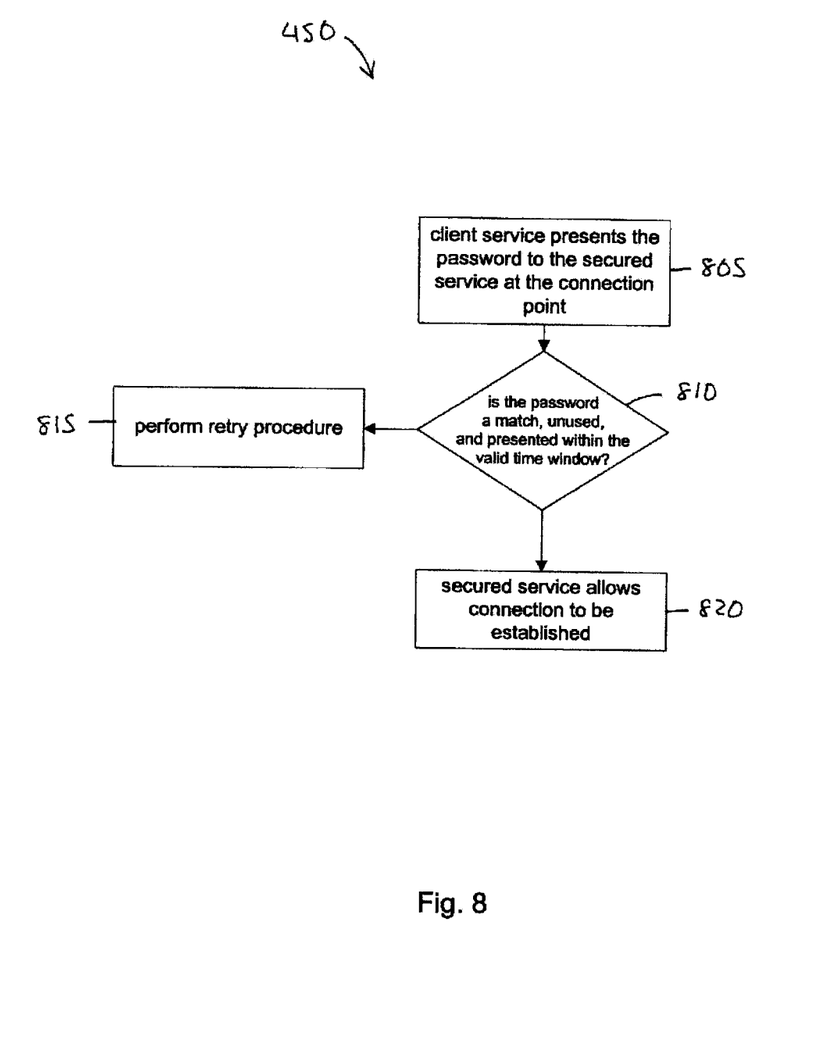
FIG. 8 is a schematic flow diagram illustrating a process that may be used to establish the brokered connection with the secured service, as provided generally in FIG. 4.

FIG. 8 illustrates a process for establishing a connection to the secured system by presenting the constrained password to the secured system that may be used in one implementation of the process of FIG. 4. The client 110 may present the constrained password to the secured service 170 at the connection point (step 805) and the secured service 170 may receive the constrained password at the connection point (step 810). Thereafter, the secured service 170 may determine if the constrained password satisfies the connection constraints, such as, for example, a constraint that the constrained password match the constrained password previously stored, that the constrained password has not previously been presented and/or used (e.g., the constrained password may be a one-time use password), that the constrained password is presented within an acceptable time window (e.g., the constrained password may be a time limited password) (step 810). The secured service 170 may refuse the connection if the constrained password does not satisfy the connection constraints, and the client 110 then may execute a retry procedure (step 815) that may correspond generally to step 460 of the process of FIG. 4. Otherwise, if the constrained password does satisfy the connection constraints (step 810), then the secured service 170 may allow the connection to be established (step 820).

Other implementations are within the scope of the following claims.

What is claimed is:

1. A method, comprising:
sending, to a server, a first request to connect with a secured service that is separate from the server;
receiving, from the server, negotiated authorization information generated by the secured service;
generating, using at least one processor, a second request to connect with the secured service, the second request to connect comprising the negotiated authorization information generated by the secured service;
sending the second request to connect to the secured service; and
synchronizing local data with remote data stored by the secured service.

2. The method as recited in claim 1, further comprising establishing a persistent connection with the server.

3. The method as recited in claim 1, further comprising receiving, from the server, a target connection point to the secured service, wherein the second request to connect to the secured service is sent to the target connection point.

4. The method as recited in claim 3, wherein the target connection point comprises an Internet Protocol address.

5. The method as recited in claim 1, further comprising selecting the secured service from a plurality of acceptable secured services.

6. The method as recited in claim 5, further comprising validating the negotiated authorization information for one of a predetermined number of uses.

7. The method as recited in claim 5, further comprising validating the negotiated authorization information within a predetermined time window.

8. The method as recited in claim 1, further comprising determining whether the negotiated authorization information satisfies a connection constraint.

9. The method as recited in claim 8, wherein the connection constraint comprises at least one of a password, a timestamp, a screen name, a login name, a biometric signature, or a digital signature.

10. A method, comprising:
receiving, at a secured service, first authentication information from a client, the first authentication information used to temporarily authenticate the client with the secured service;
receiving, at the secured service, a request from the client for second authentication information from the secured service, the second authentication information used to enable the client to access a resource of the secured service;
generating, using at least one processor, the second authentication information at the secured service based on a determination by the secured service that the client is authorized to access the resource of the secured service;
sending the second authentication information from the secured service to the client;
receiving, at the secured service, a request from the client for the resource of the secured service, the request comprising the second authentication information; and
providing the client with access to the resource of the secured service.

11. The method as recited in claim 10, further comprising requesting, in response to receiving the first authentication information from the client, that a user authenticate with the secured service in order to authorize the client to access the resource of the secured service.

12. The method as recited in claim 11, further comprising:
providing the user with an indication of the client;
providing the user with an indication of the resource of the secured service; and
prompting the user to authorize the client to access the resource of the secured service.

13. The method as recited in claim 10, wherein the resource of the secured service comprises a file associated with a user that has an account with the secured service.

14. The method as recited in claim 10, wherein providing the client with access to the resource of the secured service comprises sending the resource of the secured service to the client.

15. The method as recited in claim 10, further comprising sending the first authentication information to the client.

16. The method as recited in claim 15, further comprising determining that the second authentication information has been used for less than or equal to a predetermined number of uses.

17. The method as recited in claim 15, further comprising determining that the second authentication information has been used during a predetermined time window.

18. The method as recited in claim 10, further comprising synchronizing the resource of the secured service with the client.

19. The method as recited in claim 10, further comprising:
determining that the second authentication information is invalid; and
sending, to the client, a request to reauthenticate with the secured service.

20. The method as recited in claim 19, wherein the secured service comprises one or more of an e-mail service, a synchronization service, a print service, a file access service, an instant messaging service, an operating system, an operating system kernel, an authentication service, an authorization service, and a persistent connection service.

* * * * *